Figure 1:
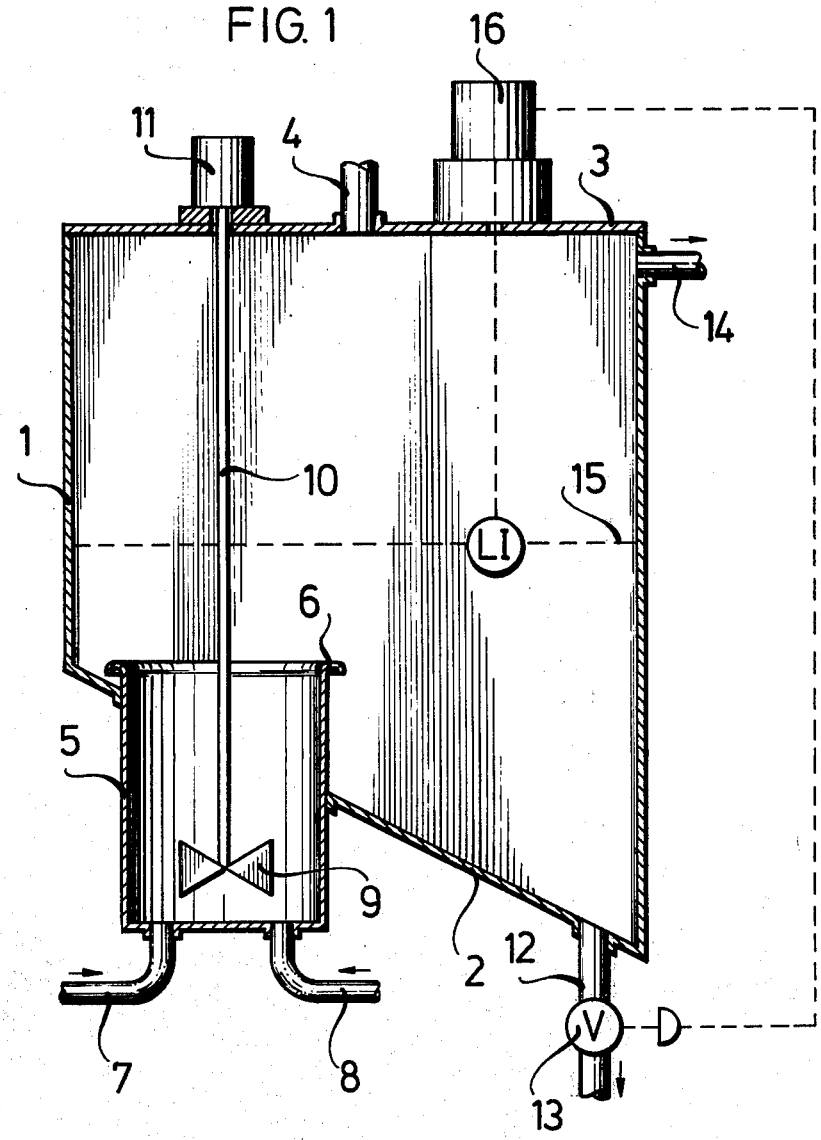

United States Patent

Gradl et al.

[11] 4,313,826
[45] Feb. 2, 1982

[54] LIQUID-LIQUID EXTRACTION APPARATUS

[75] Inventors: Reinhard Gradl, Hürth; Klaus Schrödter, Cologne; Klaus-Peter Ehlers, Erftstadt, all of Fed. Rep. of Germany

[73] Assignee: Hoechst Aktiengesellschaft, Fed. Rep. of Germany

[21] Appl. No.: 164,035

[22] Filed: Jun. 30, 1980

[30] Foreign Application Priority Data

Jul. 4, 1979 [DE] Fed. Rep. of Germany ....... 2926959

[51] Int. Cl.³ ............................................. B01D 17/02
[52] U.S. Cl. ................................... 210/114; 210/535; 210/540
[58] Field of Search ........ 210/112, 114, 115, 533–532, 210/540, 86, 256

[56] References Cited

U.S. PATENT DOCUMENTS

| | | | |
|---|---|---|---|
| 2,216,977 | 10/1940 | Mahone | 210/114 X |
| 3,275,565 | 9/1966 | Sailors | 210/533 X |
| 3,666,108 | 5/1972 | Veld | 210/535 X |
| 3,979,290 | 9/1976 | Loffler | 210/534 X |
| 4,014,791 | 3/1977 | Tuttle | 210/540 X |

Primary Examiner—Thomas G. Wyse
Attorney, Agent, or Firm—Connolly and Hutz

[57] ABSTRACT

The present invention relates to a mixer/settler-type apparatus for continuous liquid-liquid extraction. The apparatus is comprised of a separating vessel with an inclined bottom portion and an agitator-provided mixing vessel. The mixing vessel is tightly mounted to the inclined bottom portion of the separating vessel, the latter being formed with an upper outlet and a lower outlet and having a level indicator LI for determining phase boundary surface area installed therein. The lower outlet is passed through the separating vessel near its lowermost level and the upper outlet is passed therethrough near its upper end. The level indicator LI is connected to a regulator giving adjustment instructions to a structural element permitting the phase boundary surface area to be established in the separating vessel, distinctly above the upper end of the mixing vessel.

3 Claims, 2 Drawing Figures

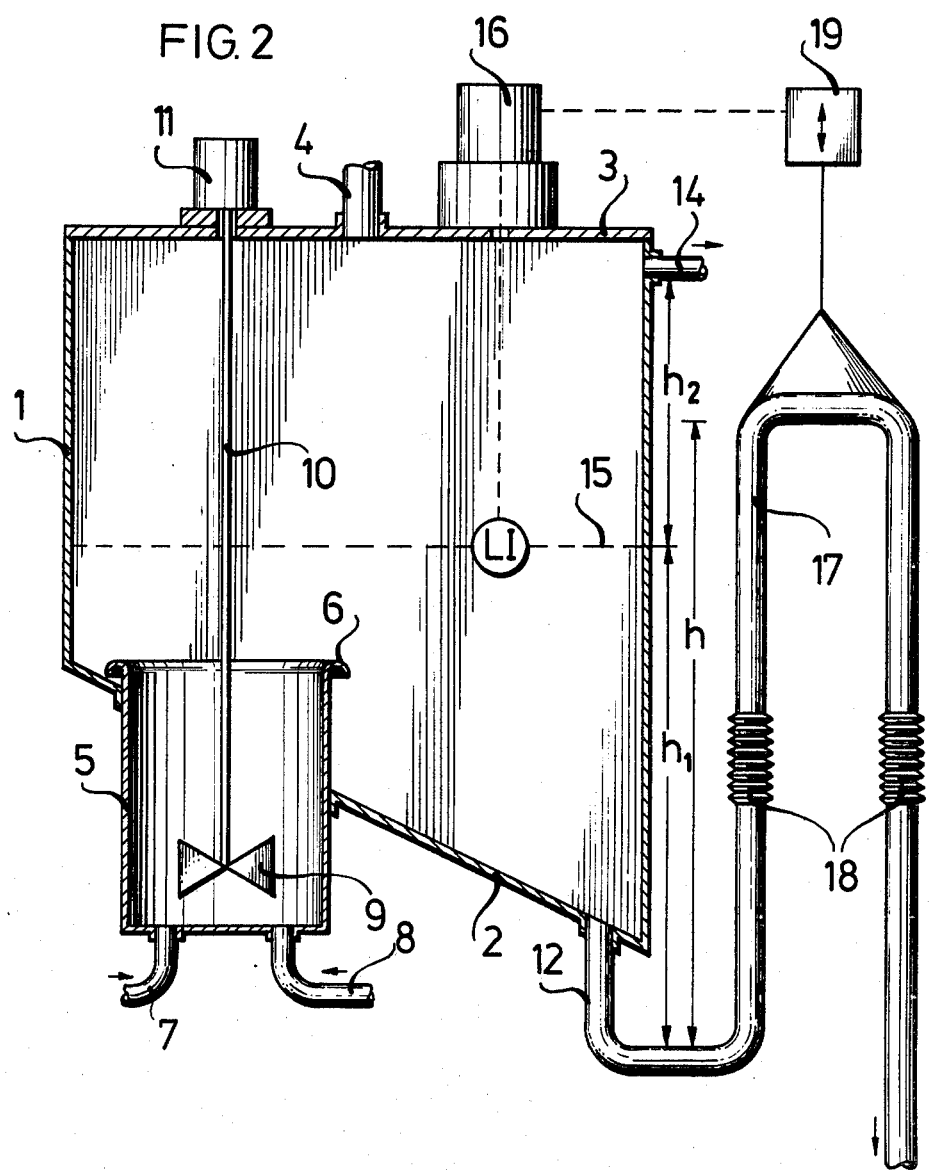

LIQUID-LIQUID EXTRACTION APPARATUS

The present invention relates to a mixing/settler-type apparatus for continuous liquid-liquid extraction, the apparatus comprising a separator provided with an inclined bottom portion, an an agitator-provided mixing vessel.

Apparatus of the mixing/settler-type are customarily used for liquid-liquid extraction. They commonly have a stage efficiency of more than 95%. In order to improve extraction, it is possible for a plurality of apparatus units to be series-connected together in box-type or tower-type fashion so as to form a battery, each extraction stage being individually adjustable and optimizable. An apparatus for use in liquid-liquid extraction comprised of a cylindrical or regular polygonal container of which the bottom portion is given the shape of a cone with the cone peak being directed downwardly, or the shape of a pyramid inclined at an angle of 10° to 40° with respect to the horizontal has been described in German Patent Specification "Offenlegungsschrift" No. 2,824,387.

Radial walls disposed inside the container subdivide it into sectors of which each is comprised of an agitator-provided mixer and separator. Each mixer has an outlet running to the respective separator, the outlet being an overflow disposed close to the container's side wall. The individual sectors are also provided with flow-defining walls or gutters causing mixed liquid phases, which come from the mixers, to travel under the action of gravity into zones near the container axis.

The mixing/settler-type apparatus described heretofore are, however, not ideally suitable whenever aqueous raffinate phases which are viscous and/or contain significant proportions of solid matter are obtained during the extraction, this being the case in the event of the extractant being a solvent immiscible or partially miscible with water.

This is more particularly the case in the process described in German Patent Specification "Auslegeschrift" No. 2,321,751, wherein crude phosphoric acid produced by subjecting crude phosphate to wet-processing treatment with an acid, is decontaminated by extracting it with a solvent, such as amyl alcohol, the solvent and acid being used in a ratio by weight of 2.5:1 to 24:1. In other words, the mixer only has a 4 to 28% proportion of dense phase therein. As a result, the continuous phase which is established in the mixing/settler-type apparatus described heretofore always is solvent phase which has dense phase dispersed therein.

In accordance with our present invention, we have found that extraction operations with the use or an organic solvent, e.g. the decontamination of crude phosphoric acid produced by subjecting crude phosphate to wet-processing treatment with an acid, can be carried out with improved efficiency by using dense phase as the continuous phase and dispersing the solvent therein.

The present invention now provides an apparatus for liquid-liquid extraction with a wide ratio of light phase to dense phase, wherein viscous raffinate phase with high solid matter content is easy to work, and wherein dense phase having solvent phase dispersed therein is automatically the continuous phase.

To this end, the present invention provides for the apparatus to comprise: a separating vessel with an inclined bottom portion and an agitator-provided mixing vessel, the mixing vessel being tightly mounted in the inclined bottom portion of the separating vessel, the latter being formed with an upper outlet and a lower outlet and having a level indicator LI for determining the phase boundary surface area installed therein, the lower outlet being passed through the separating vessel near its lowermost level and the upper outlet being passed therethrough near its upper end, and the level indicator LI being connected to a regulator giving adjustment instructions to a structural element permitting the phase boundary surface area to be established in the separating vessel, distinctly above the upper end of the mixing vessel.

Further preferred features of the present invention provide:

(a) for the mixing vessel to be arranged so as to partially open into the separating vessel;
(b) for the mixing vessel to be provided near its upper end with an overflow edge;
(c) for the mixing vessel to be formed with a plurality of inlets for admitting dense phase and light phase;
(d) for at least one of the inlets to open into the mixing vessel through the bottom portion thereof;
(e) for the structural element to comprise an automatically actuated valve, the valve being disposed inside the lower outlet;
(f) for the structural element to comprise a pump, of which the conveying capacity per unit time is controllable and adjustable, and of which the inlet side is connected, in the direction of flow, to the lower outlet; and
(g) for the structural element to comprise a siphon of which the vertex is automatically adjustable between the phase boundary surface area and upper outlet.

It is also possible for the apparatus of this invention to be provided with flow-deflecting plates and for the bottom portion of the separating vessel to be inclined at an angle of 10° to 60°, with respect to the horizontal. The bottom portion of the separating vessel may also be shaped as an oblique cone.

In the apparatus of the present invention, the mixture of dense phase and light phase is delivered from the mixing vessel to the separating vessel across a large surface area, in free fall over the upper edge of the mixing vessel, so that the vessels are practically not liable to become encrusted with solid material.

During operation of the present apparatus, dense phase travels downwardly inside the separating vessel, resulting solid matter, if any, commencing sliding on the inclined bottom towards the lower outlet through which it is removed together with dense phase via the structural element aforesaid. The light disperse phase ascends in the separating vessel, undergoes coalescence at the phase boundary surface area and forms a homogeneous organic phase which is taken from the vessel through its upper outlet.

In those cases in which the present apparatus is provided with an automatically actuated valve, the regulator should preferably be arranged so as to give timed adjustment instructions to the valve, in the event of the phase boundary surface area being found to ascend in the separating vessel. This is a safeguard against the lower outlet and valve becomming clogged by solid matter which is contained in the raffinate phase.

The apparatus of this invention will now be described with reference to the accompanying drawings showing exemplary embodiments, partially in section, of which FIG. 1 shows an apparatus provided with an automatically actuated valve and FIG. 2 shows an apparatus provided with an adjustable siphon.

A separating vessel 1 is provided with an inclined bottom portion 2 and closed by means of a cover 3 having an outgoing air outlet 4 passed therethrough. The inclined bottom 2 is provided with an aperture which has a mixing vessel 5 partially opening into the separating vessel 1 and being formed with an overflow edge 6 tightly mounted therein. Inlets 7 and 8 for supplying dense and light liquid phases, resepctively, are arranged so as to open into the mixing vessel 5. Mounted inside the mixing vessel 5 is an agitator 9 which is arranged to be driven, via a shaft 10, by a motor 11 supported by the cover 3. The separating vessel 1 has a dense phase lower outlet 12 passed through the inclined bottom 12, near the lowermost level thereof, and has an upper outlet 14 for light phase passed through its upper end. Disposed inside the separating vessel 1 is a level indicator LI, the indicator LI being disposed at a level necessary for the phase boundary surface area 15 to lie distinctly above the overflow edge 6 of the mixing vessel 5, and being connected to a regulator 16. As shown in FIG. 1, the lower outlet 12 is provided with an automatically actuated valve 13 receiving adjustment instructions from the regulator 16.

As shown in FIG. 2, the lower outlet 12 is formed with a siphon 17 having a plurality of bellows 18 arranged in its longitudinal sides. The siphon 17 is suspended from a lifting device 19 permitting the vertex of the siphon 17 to be varied. The lifting device 19 is given adjustment instructions from the regulator 16, the height h of the siphon 17 being calculated in accordance with the following equation:

$$h \cdot \rho_1 = h_1 \cdot \rho_1 + h_2 \cdot \rho_2$$

in which $h_1$ is the separation between the lowermost position of the siphon 17 and the phase boundary surface area 15, $h_2$ is the separation between the phase boundary surface area 15 and upper outlet 14, $\rho_1$ stands for the density of the dense phase and $\rho_2$ stands for the density of the light phase.

To improve the extraction rate, it is possible for a plurality of the present apparatus to be connected together so as to form a multi-stage battery.

The apparatus of the present invention should preferably be operated as follows: Dense phase is introduced into the mixing vessel and lower portion of the separating vessel. Next, the dense phase and light phase—in the event of a battery comprising n-stages, use is made of dense phase coming from the ($n^{th}-1$) stage and of light phase coming from the ($n^{th}+1$)—are admitted jointly, continuously and in the necessary ratio by weight, via the respective inlets, to the mixing vessel and intimately mixed by means of the agitator therein. The mixture flows over the upper edge of the mixing vessel into the separating vessel. As a result of the fact that the phase boundary surface area lies considerably above the upper edge of the mixing vessel, the mixture arrives in a large excess of dense phase. In this way, it is ensured that aqueous phase is the continuous phase having the light phase dispersed therein.

The apparatus of this invention is especially suitable for use in the decontamination of crude phosphoric acid, which is produced by subjecting crude phosphate to wet-processing treatment with a mineral acid, for example with the use of amyl alcohol originating from an oxo-synthesis reaction as light phase, or for the extraction of uranium from phosphoric acid, e.g. with the use of a mixture of di-octyl-pyrophosphoric acid and tri-butyl phosphate in kerosene as light phase.

We claim:

1. A mixer/settler-type apparatus for continuous liquid-liquid extraction which comprises: a mixing vessel being provided, near its upper end, with a turned down overflow edge and a separating vessel being provided with an inclined bottom portion and a cover; said mixing vessel being tightly mounted in the inclined bottom portion of the separating vessel so as to partially open thereinto; a cover-supported motor driving a shaft terminating inside the mixing vessel and being provided with an agitator fastened thereon; said mixing vessel being formed with an inlet for admitting dense phase and an inlet for admitting light phase, at least one of said inlets being arranged so as to open into the mixing vessel through the bottom portion thereof; said separating vessel being formed with an upper outlet for light phase passed through its sidewall, near the cover and being further formed with a lower outlet for dense phase passed through the inclined bottom, near the lowermost level thereof; a cover-supported regulator connected to a level indicator LI for investigating the phase boundary surface area inside the separating vessel, said level indicator LI being disposed at a level necessary for the phase boundary surface area to lie distinctly above the overflow edge of the mixing vessel; the lower outlet of the separating vessel being provided with an automatically actuated valve; and said regulator receiving signals from the level indicator LI in the event of the phase boundary surface area varying, and giving adjustment instructions to the automatically actuated valve.

2. A mixer/settler-type apparatus for continuous liquid-liquid extraction which comprises: a mixing vessel being provided, near its upper end, with a turned down overflow edge and a separating vessel being provided with an inclined bottom portion and a cover; said mixing vessel being tightly mounted in the inclined bottom portion of the separating vessel so as to partially open thereinto; a cover-supported motor driving a shaft terminating inside the mixing vessel and being provided with an agitator fastened thereon; said mixing vessel being formed with an inlet for admitting dense phase and an inlet for admitting light phase, at least one of said inlets being arranged so as to open into the mixing vessel through the bottom portion thereof; said separating vessel being formed with an upper outlet for light phase passed through its sidewall, near the cover and being further formed with a lower outlet for dense phase passed through the inclined bottom, near the lowermost level thereof; a cover-supported regulator connected to a level indicator LI for investigating the phase boundary surface area inside the separating vessel, said level indicator LI being disposed at a level necessary for the phase boundary surface area to lie distinctly above the overflow edge of the mixing vessel; the lower outlet of the separating vessel being connected to the inlet side of a pump, the conveying capacity per unit time of said pump being controllable and adjustable; and said regulator receiving signals from the level indicator LI in the event of the phase boundary surface area varying, and giving adjustment instructions to the pump.

3. A mixer/settler-type apparatus for continuous liquid-liquid extraction which comprises: a mixing vessel being provided, near its upper end, with a turned down overflow edge and a separating vessel being provided with an inclined bottom portion and a cover; said mixing vessel being tightly mounted in the inclined bottom portion of the separating vessel so as to partially open thereinto; a cover-supported motor driving a shaft terminating inside the mixing vessel and being provided with an agitator fastened thereon; said mixing vessel being formed with an inlet for admitting dense phase and an inlet for admitting light phase, at least one of said inlets being arranged so as to open into the mixing vessel through the bottom portion thereof; said separating vessel being formed with an upper outlet for light phase passed through its sidewall, near the cover and being further formed with a lower outlet for dense phase passed through the inclined bottom, near the lowermost level thereof; a cover-supported regulator connected to a level indicator LI for investigating the phase boundary surface area inside the separating vessel, said level indicator LI being disposed at a level necessary for the phase boundary surface area to lie distinctly above the overflow edge of the mixing vessel; the lower outlet of the separating vessel being connected to a siphon having a plurality of bellows arranged in its longitudinal sides, said siphon being suspended from a lifting device permitting the vertex of the siphon to be varied between the level of the phase boundary surface area and the upper outlet of the separating vessel; and said regulator receiving signals from the level indicator LI in the event of the phase boundary surface area varying, and giving adjustment instructions to the lifting device.

* * * * *